United States Patent [19]

Gerrits et al.

[11] Patent Number: 4,614,315

[45] Date of Patent: Sep. 30, 1986

[54] MAGNETIC-TAPE APPARATUS WITH IMPROVED BRAKE-TYPE TENSION CONTROL

[75] Inventors: Wilhelmus P. M. Gerrits, Eindhoven, Netherlands; Alois Huber, Vienna, Austria

[73] Assignee: U.S. Philips Corporation, New York, N.Y.

[21] Appl. No.: 705,753

[22] Filed: Feb. 26, 1985

[30] Foreign Application Priority Data

Nov. 14, 1984 [NL] Netherlands ............... 8403472

[51] Int. Cl.⁴ .................. G03B 1/04; G11B 15/32
[52] U.S. Cl. .................. 242/200; 360/74.3; 360/85; 360/95
[58] Field of Search ............... 242/75–75.5, 242/187, 189, 203–204; 360/71, 74.1, 74.2, 74.3, 85, 95; 353/26 R

[56] References Cited

U.S. PATENT DOCUMENTS

| | | | |
|---|---|---|---|
| 3,580,525 | 5/1971 | Dopner | 242/189 |
| 3,911,492 | 10/1975 | Ura | 360/85 |
| 4,074,873 | 2/1978 | Hayashi et al. | 242/75.43 |
| 4,139,169 | 2/1979 | Kono | 242/201 |
| 4,437,738 | 3/1984 | Headley et al. | 353/26 R |

Primary Examiner—Leonard D. Christian
Attorney, Agent, or Firm—David R. Treacy

[57] ABSTRACT

A bi-directional tape recorder having a single tape tension control device operable in both directions of tape transport. A flexible brake band is wrapped around a braking disc, both ends of the band being secured to the chassis. A tape tension sensing lever presses against a substantially taut part of the brake band between the braking disc and one of the two fixed ends, so that a force exerted by the lever transversely to the brake band produces a change in tensile force in the brake band which is larger than that exerted by the lever.

10 Claims, 5 Drawing Figures

MAGNETIC-TAPE APPARATUS WITH IMPROVED BRAKE-TYPE TENSION CONTROL

BACKGROUND OF THE INVENTION

The invention relates to a magnetic-tape apparatus for recording/reproducing signals on/from a magnetic tape which is movable between two reels in a first transport direction and in an opposite second transport direction, and includes a tension or tape-pull control device for controlling the longitudinal tension or tape pull in the part of the magnetic tape between the two reels. Such apparatus, whether used for both recording and reproducing, or only either one of the functions, will be referred to hereinafter, in the specification and claims, as a tape recorder.

The tension control device comprises a sensing lever which is mounted on the apparatus chassis so as to be pivotable about a pivoting axis in a first pivoting direction and in an opposite second pivoting direction a spring which acts on the sensing lever to urge it in the first pivoting direction; a tape-contact pin near the first end of the sensing lever, which when a tape is present is in contact with the part of the magnetic tape which extends between the reels; a braking disc on one of the two reel supports; and an elongate flexible braking member which surrounds at least a part of the circumference of the braking disc and which has a first end secured to an apparatus part different from the sensing lever, (that is, a part other than the lever). The braking member co-operates with the sensing lever to produce a tensile force in the braking member varying with the position of the sensing lever, and thereby influences the braking torque.

German Patent Specification No. 1,549,107 to which U.S. Pat. No. 3,580,525 corresponds, describes such a magnetic-tape apparatus in which the braking member is a brake band. In this known apparatus the tape pull for each of the two tape reels is controlled by means of an associated tension control device. Recording or reproducing of signals on the magnetic tape is effected only during transport of the magnetic tape in one of the two directions of transport. Each of the two tension control devices has a tension spring which pulls at the free second end of the relevant brake band. The sensing levers also cooperate with these free second ends to vary the braking torque.

It is advantageous if a relatively small displacement of the sensing lever results in a comparatively large variation of the braking torque. Moreover, it is desirable that the tape contact means of the sensing lever exert only a small force on the magnetic tape, so that small variations in the position of the magnetic tape and in the force exerted on the magnetic tape by the sensing lever result in large variations of the braking torque.

It is known that in the case of a flexible braking member such as a braking wire, a braking cord or a braking band which cooperates with a braking disc, the friction force exerted on the braking disc by the braking member increases exponentially in the direct of rotation of the braking disc. Therefore, it is advantageous if the friction force exerted on the braking member by the braking disc decreases towards the point where the brake lever cooperates with the braking member. In the known magnetic-tape apparatus this is the case in the "playback" mode.

SUMMARY OF THE INVENTION

It is the object of the invention to increase the variations in braking force as a result of variations in the position of the sensing lever for given dimensions of the lever. According to the invention the second end of the braking member is secured to an apparatus part different from the sensing lever; that is, neither end of the braking member is connected to or controlled by the sensing lever. Instead the sensing lever cooperates with the braking member at a point which is situated between the braking disc and an end of the braking member by exerting a force transverse to the braking member.

Particularly when the part of the braking member between the braking disc and the second end is nearly taut, only a small transverse force is necessary to produce a comparatively large change of force in the longitudinal direction of the braking member. Indeed, the braking member is flexible and therefore it cannot take up compressive forces, so that the reactive force must be provided by only the tensile forces in the braking member. However, these forces act substantially perpendicularly to the exerted transverse force and therefore they yield only a small component which counteracts the transverse force. In this way it is possible to produce tensile forces in the braking member which are several times, for example six times, as large as the transverse force exerted by the sensing lever.

Another advantage is that the lever pivot is not loaded by the large tensile forces in the braking member but is subjected only to the small forces exerted on the sensing lever. The tensile forces in the braking member are taken up by the points of attachment to the chassis and the supporting means of the spindle. To maximize sensitivity of the sensing lever to variations in pull in the magnetic tape, it is advantageous that the load force on the sensing lever pivot be small, so that the hysteresis in the pivot of the sensing lever is minimal. Further advantages are obtained with respect to the mounting of the tape pull control device. Indeed, the braking member need no longer be connected to a moving part of the apparatus.

In a preferred embodiment the pivotal axis of the sensing lever is situated between the first end and the second end of the lever and the sensing lever is provided with a pin or first pressure means near its second end for exerting direct pressure on the braking member in a first pressing direction when the sensing lever is pivoted in its first pivoting direction. This embodiment has the advantages that it requires a small number of parts and that the sensing lever can be mounted easily. Indeed, the sensing lever is separated entirely from the braking member and may be mounted or removed subsequently without affecting the mounting of the braking member.

Another embodiment of the invention has the advantage that the same tension control device may also be used during the transport of the magnetic tape in the second transport direction. This is important for magnetic-tape apparatuses with which signals can be recorded on or reproduced from the magnetic tape in each of the two directions of tape transport. In this embodiment the sensing lever carries second pressure means near its second end for exerting pressure on the braking member in a second pressing direction opposite to the first pressing direction when the sensing lever is pivoted in the second pivoting direction.

According to a further preferred embodiment, the first pressure means cooperates with the braking member at a point which is situated between its first end and the braking disc, and the second pressure means cooperates with the braking member at a point which is situated between its second end and the braking disc. In this embodiment another braking characteristic is obtained, which will be discussed in more detail hereinafter.

In many modern magnetic-tape apparatuses, in each of the two directions of transport of the magnetic tape, for reasons of economy only the "downstream" or take-up reel is driven. Only a single drive motor is provided which drives only the downstream reel through a transmission device which can be moved between a first position for transport of the magnetic tape in the first transport direction and a second position driving the other reel for transport of the magnetic tape in the second transport direction. Generally, the transmission device comprises a pivotal support or other member which is pivoted from one side to the other side when the direction of rotation of the motor is reversed. As a result of this, a drive wheel which is mounted on the pivotal member and which is driven by the motor is pivoted from one reel to the other.

In magnetic tape apparatuses of this kind problems may arise when the direction of transport of the magnetic tape is reversed. If at this instant the magnetic tape is not taut, the sensing lever will be in a position in which the braking member exerts the maximum braking torque. Preferably, this maximum braking torque is larger than the maximum driving torque that can be produced by the motor. This is important in order to ensure that the tension control device will operate correctly in all cases in which magnetic tape transport in the second direction is effected. However, if the brake is fully activated the motor will not be capable of moving the new "downstream" reel in the second transport direction. In view of this problem, in a further preferred embodiment of the invention the transmission device is coupled to the sensing lever and moves this lever in the second pivoting direction when the transmission device moves from the first position to the second position, so as to disengage the braking member from the circumference of the braking disc. After driving of the new upstream reel in the second transport direction has commenced, the magnetic tape will be pulled taut and the tension or tape-pull control device can revert to normal operation.

Variations in length of the braking member arising during manufacture may give rise to variations in the position of the braking lever. This is undesirable, in particular if tape transport in the second transport direction is required, as it is necessary to minimize the variations in the various parameters which affect the tension in the magnetic tape when the transport direction is reversed. In an embodiment of the invention which is advantageous in this respect and which, in principle, may be combined with any one of the preceding embodiments, at least one of the two ends of the braking member is adjustable in its longitudinal direction.

Some embodiments of the invention will be described in more detail, by way of example, with reference to the accompanying drawings.

DESCRIPTION OF THE PREFERRED EMBODIMENTS

Figure 1:
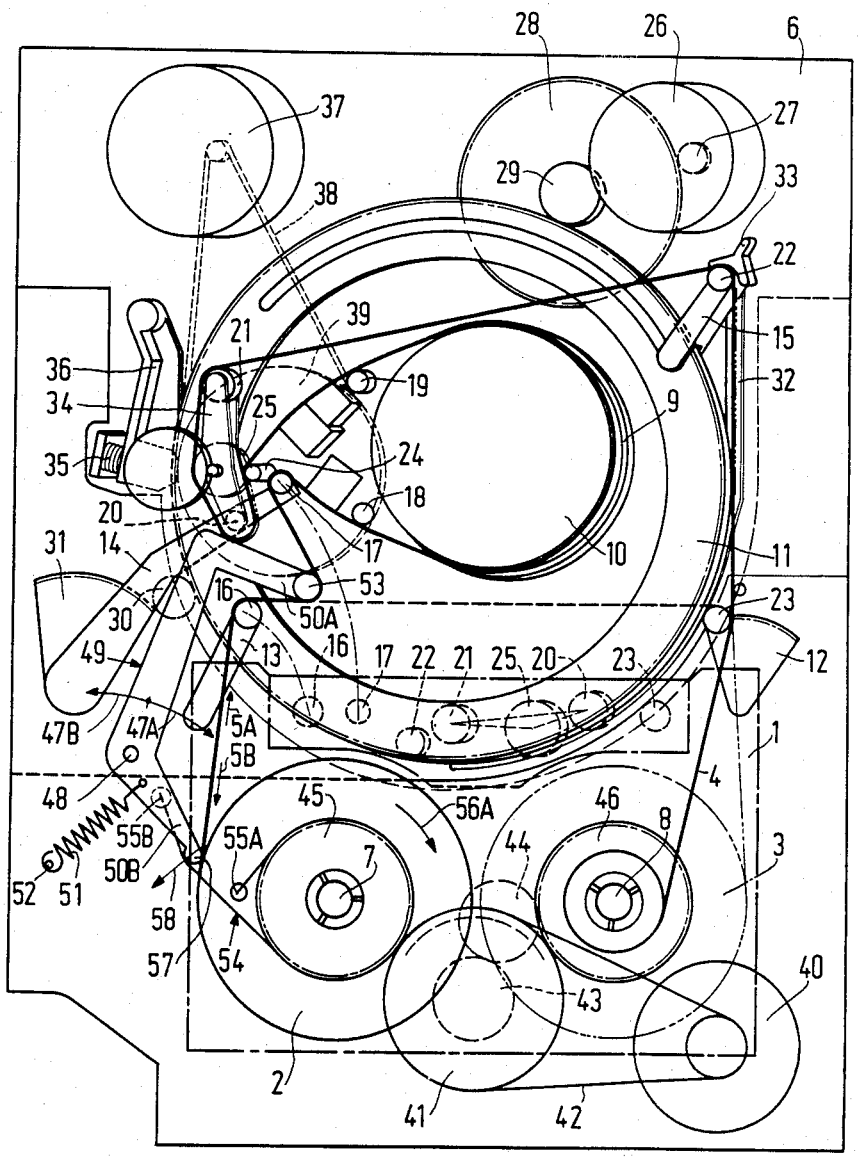
FIG. 1 is a schematic plan view of a video recorder deck which cooperates with a magnetic-tape cassette.

The deck shown in FIG. 1 constitutes practically the entire mechanical section of a tape recorder for a magnetic tape 4 which is movable between two reels 2 and 3 of a magnetic-tape cassette 1. Those parts of the magnetic-tape cassette which are important for the description of the operating principle of the invention are shown in dash-dot lines. The magnetic tape is shown in solid lines. The tape deck is suitable for transport of the magnetic tape between the reels in two opposite transport directions 5A and 5B.

The deck comprises a chassis or deck plate 6 on which reel supports in the form of two reel discs 7 and 8, for each of the reels 2 and 3 respectively, are mounted for rotation.

The deck plate 6 carries a rotary scanning system 9 around which the magnetic tape 4 is wrapped along a helical path through an angle of approximately 220°. The scanning system comprises a rotary upper drum 10 carrying two magnetic heads, not shown, which can record or read oblique parallel tracks across the width of the magnetic tape in the usual known manner. Such rotary scanning systems are employed on a large scale in magnetic video tape recorders, and for this reason the scanning system and other parts which are not relevant to the present invention will not be described in more detail. It is to be noted only that for threading the magnetic tape around the scanning system 9 there is provided a threading mechanism of a known type, which comprises a threading ring 11 which is mounted for rotation on the deck plate. Further, some elements of the threading mechanism which can pivot separately are shown, such as the gear segment 12 and the levers 13, 14 and 15.

A number of guide elements bearing the reference numerals 16 to 23 are provided for guiding the tape 14. For driving the magnetic tape, a pressure roller 25 presses the magnetic tape against a capstan 24. Before the tape is threaded these tape-guide elements and the pressure roller are situated behind the magnetic tape in an opening in the cassette. The positions of the tape-guide elements and the pressure roller in this starting condition are shown in broken lines.

For the purpose of threading there is provided a motor 26 which drives the ring 11 via a pinion 27 and the gear wheels 28 and 29. The outer teeth of the ring 11 engage the teeth of the segment 12 and, through an idler wheel 30, also drive the teeth of a gear segment 31 which is connected to the lever 14. The lever 13 is also pivoted by the rotation of the threading ring 11, but the manner in which it is driven is not shown for the sake of clarity.

The magnetic tape is threaded as follows: the motor 26 is energized and the threading ring 11 is rotated counter-clockwise via the gear train 27-28-29. The gear segment 12 pivots the tape-guide element 23 and at the same time the levers 13 and 14 are pivoted in a similar way, thereby causing the tape-guide elements 16 and 17 to be pivoted. The tape-guide elements on the threading ring 11 now thread the magnetic tape in a loop around the scanning system 9. The lever 15 then performs a swing-out movement relative to the threading ring through cooperation with a guide 32 on the deck plate 6, so that the tape guide element 22 assumes an end position which is defined by a stop 33 on the deck plate. The pressure roller 25 is mounted in a double lever 34 which is pivotable about the center of the tape-guide element 21 and is urged into the operating position by a pressure lever 36 which is loaded by a spring 35.

For driving the capstan 24 there is provided another electric motor 37 which drives a pulley 39 on the capstan 24 via a belt 38. The reels 2 and 3 are driven by an electric motor 40. This motor drives a wheel 41 via a belt 42. The wheel 41 carries a gear wheel 43 which drives a gear wheel 44 which engages either a gear wheel 45 on the reel 2 or a gear wheel 46 on the reel 3, depending on the direction of rotation of the motor 40. The mechanism necessary for pivoting the gear wheel 44 from the gear wheel 45 to the gear wheel 46 or the other way round is not shown in FIG. 1 but in principle it may be of a type as will be described hereinafter with reference to FIG. 4.

In accordance with the invention a tape-pull or tension control device controls the tape pull in the part of the magnetic tape between the two tape-guide elements 16 and 17. The control device comprises a sensing lever 49 having a first end 50A and a second end 50B, which is mounted on the deck plate 1 so as to be pivotable about a spindle 48 in a first pivoting direction 47A and an opposite second pivoting direction 47B. A helical tension spring 51 which is pre-tensioned between the sensing lever and a pin 52 on the deck plate 6 acts on the sensing lever. The tension spring 51 urges the sensing lever in the first pivoting direction 47A. Near the first end 50A of the sensing lever 49 there are arranged tape-contact means in the form of a tape-guide pin 53, which is in contact with the part of the magnetic tape between the tape-guide elements 16 and 17 when a tape is present.

The reel disc 7 carries a braking disc which in the embodiment shown in FIG. 1 is integral with a gear wheel, for which reason the combination of the braking disc and the gear wheel bears the reference numeral 45. In the present context the term "braking disc" also refers to similar braking members which are not exactly disc-shaped. It is essential only that there is a cylindrical braking surface. This surface may be, for example, a surface of a braking drum or a shaft.

An elongate flexible braking member 54, which in the present embodiment comprises a brake band, is arranged around at least a part of the circumference of the braking disc 45. Instead of a brake band it is possible to use a braking cord, a braking wire or any other suitable flexible braking member. A first end 55A of the brake band is secured directly to the deck plate and the brake band cooperates with the sensing lever 49 to produce a tensile force in the band which depends on the position of the sensing lever, in order to obtain a braking torque between the braking disc 45 and the brake band as a function of the tension in the magnetic tape 4. The second end 55B of the brake band 54 is also secured directly to the deck plate 6. The sensing lever 49 cooperates with the brake band 54 at a point which is situated between the braking disc 45 and the second end 55B, and exerts a force F (FIG. 2) on the brake band which is directed transversely of this band.

Figure 2:
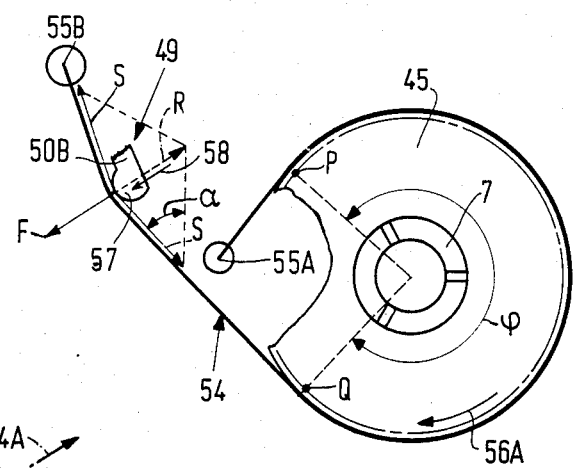
FIG. 2 is a schematic view which shows a part of FIG. 1 to an enlarged scale and represents some forces resolved into their components.

The effect of the invention will be illustrated by means of FIG. 2. During transport of the magnetic tape in the first transport direction 5A, see FIG. 1, the reel 2 rotates in the direction 56A. The brake band 54 encloses the braking disc 45 over an angle $\phi$ which extends from a point P where, proceeding from the first end 55A to the second end 55B, the brake band enters into contact with the braking disc 45, to a point Q where the brake band loses contact with the braking disc 45. If a tensile force is exerted in the brake band 54 the friction torque between the brake band and the braking disc 45 will be:

$$M = SR(e^{\mu\phi} - 1)$$

where M is the friction torque in Newton meters at the circumference of the braking disc, S is the tensile force in Newtons in the part of the brake band between point Q and the second end 55B, R is the radius in meters of the braking disc, e is the base of the natural logarithm, $\mu$ is the coefficient of friction between the brake band and the braking disc, and $\phi$ is the wrapping angle in radians between points P and Q.

For a large braking torque on the braking disc 45 it is therefore necessary to aim at a large diameter of the braking disc, a large angle $\phi$, a large coefficient of friction $\mu$ between the brake band and the braking disc, and a large tensile force S. The dimensions of the braking disc are dictated by aspects of construction engineering in combination with the dimensions of the cassette and the other parts of the tape deck. The angle $\phi$ can be enlarged by wrapping the braking member several times around the braking disc however, such an arrangement creates constructional problems in the case of a brake band but is possible in the case of a braking cord. In the present example the brake band is wrapped around the braking disc in such a way that the part between the braking disc and the second end 55B almost contacts the first end 55A, the brake band being situated entirely in the plane of rotation of the braking disc 45. The magnitude of the coefficient of friction between the brake band and the braking disc depends on the materials used and is therefore dictated by the choice of these materials.

The invention in particular aims at increasing the ratio between the tensile force S in the brake band and the transverse force F exerted on the brake band 54 by the sensing lever 49. The pivotal spindle 48 of the lever 49 is situated between the first end 50A and the second end 50B of this lever. Near the latter end there are arranged first pressure means 57 in the form of a pressure nose which is integral with the sensing lever. Via this pressure nose, direct pressure can be exerted on the brake band 54 in a first pressing direction 58 when the sensing lever is pivoted in its first pivoting direction 47a. Thus, the pressure nose 57 exerts a transverse force F on the part of the brake band between the braking disc 45 and the second end 55B. As is shown in FIG. 2 the reactive force R is the resultant of the two opposed tensile forces S which occur in this section of the brake band. The forces S increase as the angle $\alpha$ between the two parts of the brake band on each side of the pressure nose 57 decreases, enabling a substantial value of the quotient S:F to be obtained by a suitable choice of the angle $\alpha$.

Figure 3:
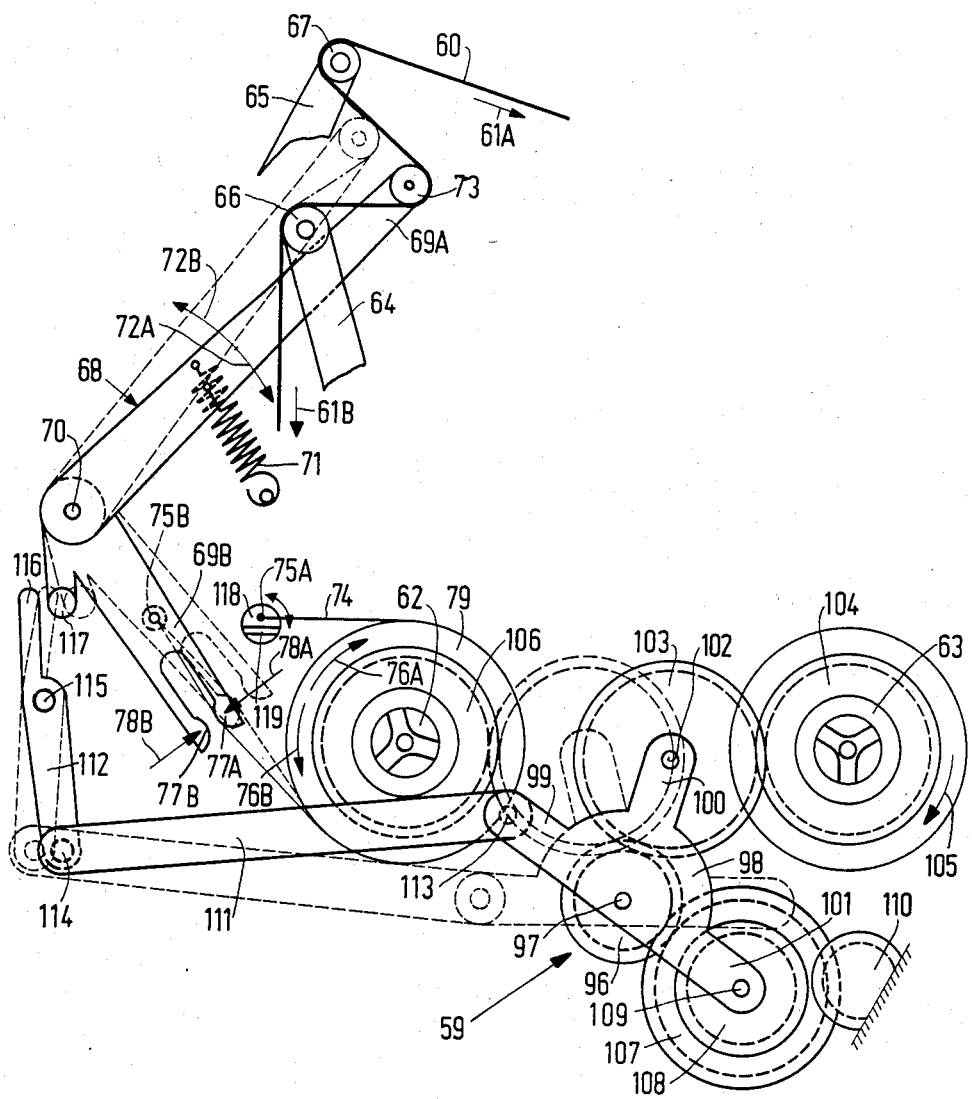
FIG. 3 is a schematic view which shows another version of a tape-pull control device.

In FIG. 3 the reel discs bear the reference numerals 62 and 63 and the magnetic tape is referenced 60. The first transport direction of the magnetic tape is 61A and the second transport direction is 61B. Instead of the levers 13 and 14 of the FIG. 1 embodiments levers 64 and 65 have ends which carry tape-guide elements 66 and 67. The sensing lever 68 is again a two-arm lever with a first end 69A and a second end 69B; and between these ends it is pivotally mounted by means of a pivot 70. A tension spring 71 urges the sensing lever in its first pivoting direction 72A. The first end 69A of the sensing lever 68 carries tape-contact means in the form of a contact roller 73, which is in contact with that part of the magnetic tape which is situated between the two tape-guide elements 66 and 67.

In the FIG. 3 embodiment the braking member is again a brake band 74 having a first end 75A and a second end 75B. During transport of the magnetic tape 60 in the first transport direction 61A the reel 62 rotates in a direction of rotation 76A. The sensing lever 68 is in the position shown in solid lines during transport of the magnetic tape in the first transport direction. Again the sensing lever comprises first pressure means in the form of a pressure nose 77A on its second end 69B for directly exerting pressure on the brake band 74 when the sensing lever is pivoted in its first pivoting direction 72A.

In contradistinction to the sensing lever shown in FIG. 1, the sensing lever shown in FIG. 3 also comprises second pressure means in the form of a second pressure nose 77B near its second end 69B, to exert pressure on the braking member in a second pressing direction 78B opposite to the direction 78A when the sensing lever is pivoted in the second pivoting direction 72B. The second pressure nose 77B cooperates with the brake band 74 during transport of the magnetic tape in the second transport direction 61B while recording or reproducing signals on/from the magnetic tape. The sensing lever 68 is then in the position shown in dash-dot lines, in which it has been pivoted slightly in the second pivoting direction.

The position of the brake band between the reel disc 62 and the second end 75B during tape transport in the second direction 61B is indicated by a broken line. The reel disc 62 rotates in its second direction of rotation 76B. It will be evident that in this situation an entirely different braking characteristic is obtained. Owing to the pivotal movement of the sensing lever 68 in the second pivoting direction 72B the tension spring 71 has been extended to a certain extent, so that the pull in the magnetic tape 60 will be slightly larger, although in practice this may be minimal depending on the dimensioning of the tension spring 71. A more important difference is that the pressure nose 77B now cooperates with that part of the brake band 74 which, in relation to the direction of rotation of the reel disc and in comparison with the preceding situation, is situated at the other side of the braking drum 79. Variations in tensile force in the part of the brake band between the second end 75B and the braking drum 79 therefore now have less effect on the resulting braking torque. Generally, this is regarded as an advantage because in the second transport direction the part of the magnetic tape with which the sensing lever cooperates is situated "downstream" of the scanning unit. The rotary drum of the scanning unit in fact also brakes the tape to some extent. In the second transport direction variations in tape pull therefore have a greater influence on the variation of the friction between the magnetic tape and the scanning system than in the first direction of transport of the magnetic tape.

Figure 4:
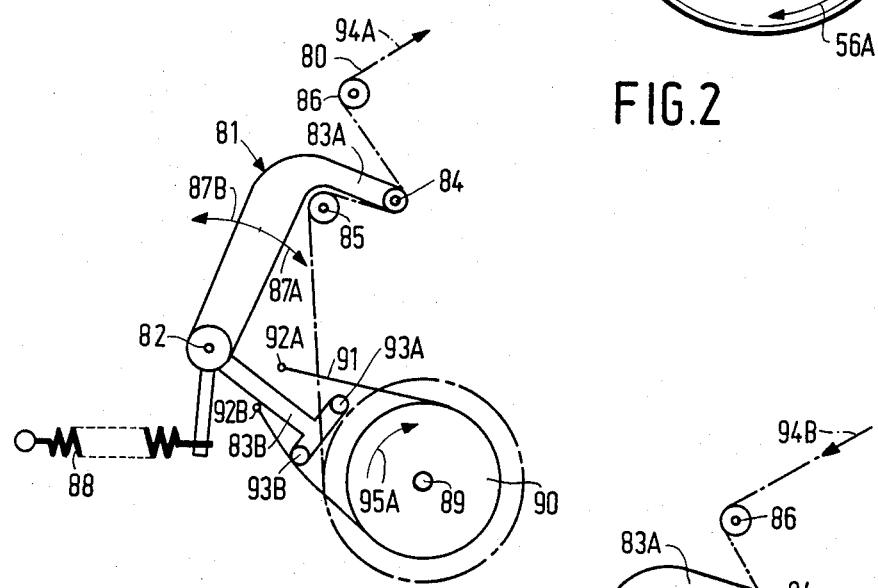
FIGS. 4 and 5 is a schematic view which show a tape-pull control device intended for use in a deck as shown in FIG. 1 in detail in two different positions.
Figure 5:
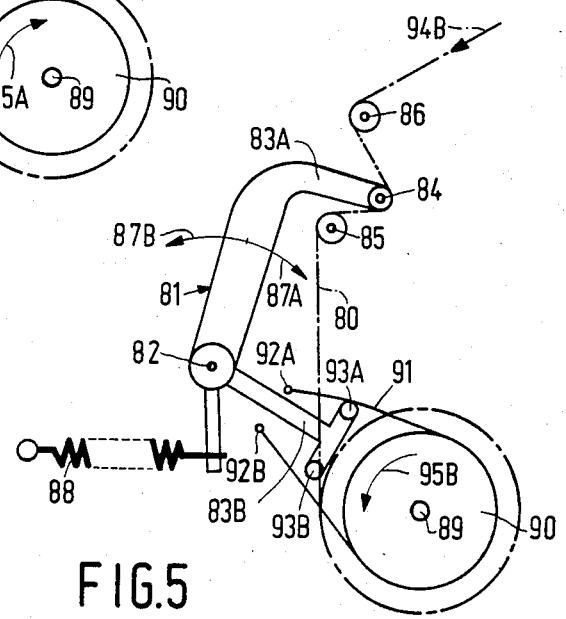

However, if desired, another embodiment of the invention as shown in FIGS. 4 and 5 may be used. In these figures the magnetic tape 80 is shown in dash-dot lines. The sensing lever 81 again comprises two arms and is pivotable about a pin 82 between the first and second ends 83A and 83B. The first end 83B carries a guide roller 84 which cooperates with the magnetic tape at a point between two guide rollers 85 and 86 which correspond to the tape-guide elements 16 and 17 in FIG. 1. A tension spring 88 urges the sensing lever 81 in the first pivoting direction 87A. The reel disc 89 carries a braking drum 90 around which a braking member in the form of a braking cord or a brake band 91 is arranged. The braking member is secured at its first end 92A and its second end 92B. The first pressure means 93A of the sensing lever cooperates with the braking member 91 at a point which is located between the first end 92A and the braking disc 90 (FIG. 4), and the second pressure means 93B cooperates with the braking member at a point which is situated between the second end 92B and the braking disc 90 (FIG. 5).

FIG. 4 shows the situation in which recording or reproducing is effected during transport of the magnetic tape 80 in the first transport direction 94A. This corresponds to a first direction of rotation 95A of the braking drum.

FIG. 5 shows the situation in which during recording or reproduction the magnetic tape is moved in the second transport direction 94B, which corresponds to a direction of rotation 96B of the braking drum.

FIG. 3 also shows a part of a transmission device by means of which only the downstream reel is driven in each of the two transport directions 61A and 61B. Driving is effected by means of a single winding motor, such as the motor 40 in FIG. 1. The winding motor drives a gear wheel 96. This gear wheel is rotatable about a stationary spindle 97 about which a member 98 is pivotable. This member comprises three limbs 99 to 101. The limb 100 carries a pin 102 about which a gear wheel 103, which is in constant mesh with the gear wheel 96, is rotatable. In a first position shown in solid lines the gear wheel 103 engages a gear wheel 104 on the reel disc 63 and drives this gear wheel in a direction of rotation corresponding to the first transport direction 61A of the magnetic tape 60. In a second position shown in broken lines the gear wheel 103 engages a gear wheel 106 on the spindle 62 and drives this wheel in the second direction of rotation 76B which corresponds to the second transport direction 61B of the magnetic tape.

The gear wheel 103 is set from its first position to its second position by reversing the direction of rotation of the winding motor. The reactive force between teeth of the gear wheels 103 and 104 will produce an initial pivotal movement of the member 98. For a rapid and reliable pivotal movement there are further provided two coaxial auxiliary gear wheels 107 and 108 which are mounted for rotation about a pin 109 on the end 101 of the member 98. The gear wheel 107 is constantly in mesh with the gear wheel 96 and rotates freely and consequently has no function in the first and in the second position of the member 98. However, a small initial pivotal movement of the member 98 results in the gear wheel 108 meshing with the gear segment 110 which is rigidly mounted on the deck plate. As a result of this temporary engagement, the member 98 is pivoted further by the motor torque which is transmitted to the gear rack 110 via the gear wheels 96, 107 and 108. This ensures a rapid and reliable change-over. At the end of the pivotal movement the gear wheel 108 and the gear rack 110 are again disengaged, so that the drive of the magnetic tape 60 on the second transport direction 61B is not obstructed.

By means of the limb 99 the transmission device is coupled to the sensing lever 68. Coupling is effected by means of a coupling lever 111, a two-arm lever 112 and pivots 113, 114 which connect the levers pivotally to each other. The lever 112 is pivotable about a stationary pin 115. The end 116 can transmit pressure to a projection 117 of the sensing lever 68. When the transmission device 59 is set from the first position to the second position the end 116 is urged against the pressure nose 117, thereby moving the sensing lever in the second pivoting direction 72B. As a result, the sensing lever assumes a position between the first and the second position. In this intermediate position neither the pressure nose 77A nor the pressure nose 77B cooperate with the braking member 74, so that this member is clear of the circumference of the braking disc. Thus, when the tape 61 is somewhat slack during reversal of the transport direction, the tension spring 71 will not prevent the winding motor from driving the spindle 62 in its second transport direction 76B. Once the transmission movement is completed and driving takes place, the magnetic tape is pulled taut between the tape guide elements 66 and 67 and the sensing lever is moved further into its second position shown in broken lines.

The first end 75A of the braking member is secured eccentrically to a rotatable adjusting element 118 which is formed with an eccentric screwdriver slot 119. By rotating the adjusting element 118 the desired position of the sensing lever 68 can be adjusted simply, regardless of dimensional and manufacturing tolerances of the various parts of the tension control device.

With the context of the invention many alternative embodiments may be designed, the main feature of the invention being that the tape tension sensing lever does not pull an end of the braking member. Instead, the braking member is secured at both its ends to other parts of the apparatus, and the sensing lever exerts a transverse force on the braking member at a point between the braking disc and an end. Thus a tensile force may be produced in the braking member which is several times greater than the transverse force exerted by the sensing lever.

What is claimed is:
1. A tape recorder including:
a chassis,
first and second reel supports mounted to the chassis for rotation about respective axes, for supporting respective reels between which a length of magnetic tape extends, portions of the tape being wound around at least one of the reels,
means for transporting said tape between the reels in a first transport direction and in an opposite second transport direction, and
a tension control device for controlling the tension in the part of the tape extending between the reels, said device comprising:
a braking disc mounted on one of said reel supports for rotation therewith, and having a circumference concentric with the respective support axis,
a sensing lever having a first end and a second end, mounted for pivoting about a lever pivoting axis in a first pivoting direction and in an opposite second pivoting direction,
resilient means arranged to act on said lever for urging it in said first pivoting direction,
tape contact means connected to said lever near said first end, arranged such that when a tape is present said contact means contacts said part of the tape extending between the reels, and
an elongate flexible braking member arranged to surround at least a part of said circumference in contact therewith, and having first and second ends; said first end being secured to a recorder part other than said lever; said sensing lever cooperating with said braking member to produce a tensile force in the braking member responsive to the pivoted position of the lever, thereby influencing the braking torque resulting from contact pressure of the member on the disc so as to control the tension in said part of the tape,
characterized in that the second end of the braking member is secured to another part of the recorder other than said lever, and
said lever cooperates with said member at a location between the braking disc and an end of the member, by exerting a force on said member perpendicular to the direction of member elongation at said location.

2. A recorder as claimed in claim 1, characterized in that the lever pivoting axis is located between said first and second lever ends, and
near said first end the lever comprises first pressure means for exerting direct pressure on the braking member in a first pressing direction when the lever is pivoted in said first pivoting direction.

3. A tape recorder including:
a chassis,
first and second reel supports mounted to the chassis for rotation about respective axes, for supporting respective reels between which a length of magnetic tape extends, portions of the tape being wound around at least one of the reels,
means for transporting said tape between the reels in a first transport direction and in an opposite second transport direction, and
a tension control device for controlling the tension in the part of the tape extending between the reels, said device comprising:
a braking disc mounted on one of said reel supports for rotation therewith, and having a circumference concentric with the respective support axis,
a sensing lever having a first end and a second end, mounted for pivoting about a lever pivoting axis in a first pivoting direction and in an opposite second pivoting direction,
resilient means arranged to act on said lever for urging it in said first pivoting direction,
tape contact means connected to said lever near said first end, arranged such that when a tape is present said contact means contacts said part of the tape extending between the reels, and
an elongate flexible braking member arranged to surround at least a part of said circumference in contact therewith, and having first and second ends; said first end being secured to a recorder part other than said lever; said sensing lever cooperating with said braking member to produce a tensile force in the braking member responsive to the pivoted position of the lever, thereby influencing the braking torque resulting from contact pressure of the member on the disc so as to control the tension in said part of the tape, characterized in that said first and second ends of the braking member are each secured to said chassis, the lever pivoting axis is located between said first and second lever ends, near said first end the lever comprises first pressure means for exerting direct pressure on the braking member, at a location between the braking disc and an end of the member, in a first pressing direction perpendicular to the direction of member elongation at said location, when the lever is pivoted in said first pivoting direction, and near said second end the lever comprises second pressure means for exerting pressure on said member in a second pressing direction opposite to said first pressing direction when the sensing lever is pivoted in said second pivoting direction.

4. A recorder as claimed in claim 3, characterized in that said first pressure means cooperates with the member at a location between the braking disc and the member first end, and said second pressure means cooperates with the member at a location between the braking disc and the member second end.

5. A tape recorder including:

a chassis, first and second reel supports mounted to the chassis for rotation about respective axes, for supporting respective reels between which a length of magnetic tape extends, portions of the tape being wound around at least one of the reels, means for transporting said tape between the reels in a first transport direction and in an opposite second transport direction, said means comprising a single motor which drives the respective upstream reel only, and a transmission device movable between first and second positions for transport of the tape in said first and second transport directions respectively, and a tension control device for controlling the tension in the part of the tape extending between the reels, said device comprising:

a braking disc mounted on one of said reel supports for rotation therewith, and having a circumference concentric with the respective support axis, a sensing lever having a first end and a second end, mounted for pivoting about a lever pivoting axis in a first pivoting direction and in an opposite second pivoting direction, resilient means arranged to act on said lever for urging it in said first pivoting direction, tape contact means connected to said lever near said first end, arranged such that when a tape is present said contact means contacts said part of the tape extending between the reels, and an elongate flexible braking member arranged to surround at least a part of said circumference in contact therewith, and having first and second ends; said first end being secured to a recorder part other than said lever; said sensing lever cooperating with said braking member to produce a tensile force in the braking member responsive to the pivoted position of the lever, thereby influencing the braking torque resulting from contact pressure of the member on the disc so as to control the tension in said part of the tape, characterized in that the second end of the braking member is secured to another part of the recorder other than said lever, said lever cooperates with said member at a location between the braking disc and an end of the member, by exerting a force on said member perpendicular to the direction of member elongation at said location, and said transmission device is coupled to said lever for moving the lever in the second pivoting direction when the transmission device moves from the first position to the second position, thereby disengaging the braking member from said disc circumference.

6. A recorder as claimed in claim 5, characterized by comprising means for adjusting at least one of the ends of the braking member in its longitudinal direction.

7. A recorder as claimed in claim 5, characterized in that the lever pivoting axis is located between said first and second lever ends, and near said first end the lever comprises first pressure means for exerting direct pressure on the braking member in a first pressing direction when the lever is pivoted in said first pivoting direction.

8. A recorder as claimed in claim 7, characterized in that near said second end the lever comprises second pressure means for exerting pressure on said member in a second pressing direction opposite to said first pressing direction when the sensing lever is pivoted in said second pivoting direction.

9. A recorder as claimed in claim 8, characterized in that said first pressure means cooperates with the member at a location between the braking disc and the member first end, and said second pressure means cooperates with the member at a location between the braking disc and the member second end.

10. A recorder as claimed in claim 9, characterized by comprising means for adjusting at least one of the ends of the braking member in its longitudinal direction.

* * * * *